Jan. 12, 1932.  C. C. PECK  1,840,737
ARC WELDING MECHANISM
Filed Sept. 27, 1927
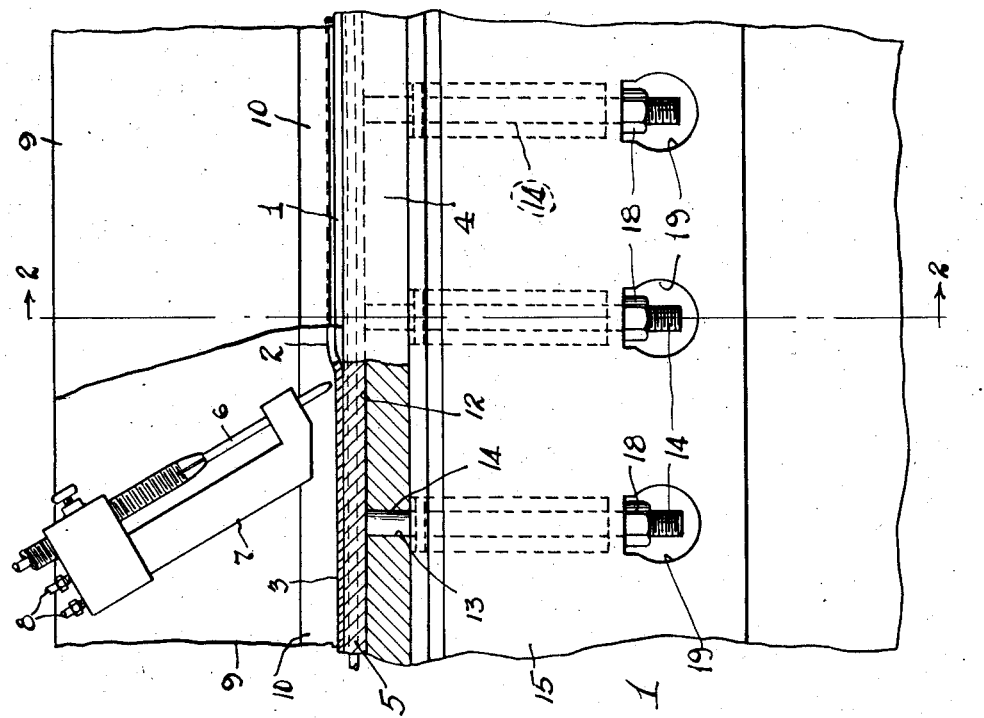
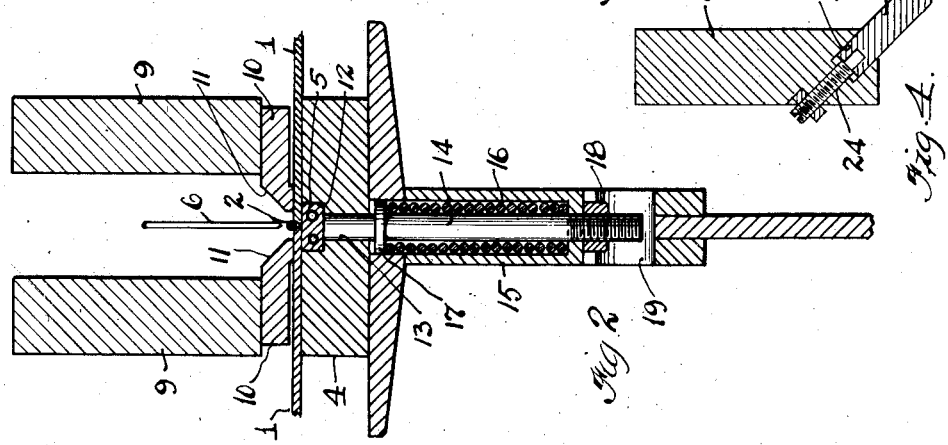
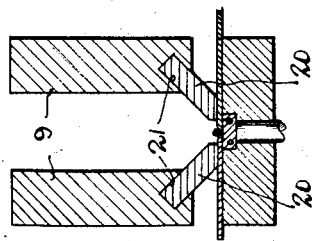
INVENTOR.
Cecil C. Peck.
BY
Fay, Oberlin & Fay
ATTORNEYS Patented Jan. 12, 1932

1,840,737

UNITED STATES PATENT OFFICE

CECIL C. PECK, OF CLEVELAND, OHIO, ASSIGNOR TO THE LINCOLN ELECTRIC COMPANY, OF CLEVELAND, OHIO, A CORPORATION OF OHIO

ARC WELDING MECHANISM

Application filed September 27, 1927. Serial No. 222,252.

The present improvements relate more particularly to arc welding mechanism wherein an electric arc is struck between the part or parts to be worked and a carbon electrode that is moved relatively to such parts so as to cause the arc to traverse the work. Usually the metal plates or other equivalent parts to be joined are brought together with their edges in abutting relation, a filler strip or wire is inserted between such edges or along the line of the seam and the effect of the arc is to interfuse such strip and edges so as firmly and permanently to weld the parts together.

The object of the present improvements is to provide an apparatus or mechanism for carrying on the foregoing operation more conveniently and effectively. At the same time provision is made for controlling the blow of the arc and for so confining the molten metal that results from the action of the arc as to insure the production of an even, smooth welded joint.

To the accomplishment of the foregoing and related ends, the invention, then, consists of the means hereinafter fully described and particularly pointed out in the claims, the annexed drawings and the following description setting forth in detail certain mechanism embodying the invention, such disclosed means constituting, however, but one of various mechanical forms in which the principle of the invention may be used.

In said annexed drawings:—

Fig. 1 is a side elevation of an arc welding mechanism or apparatus embodying my present improvements, such apparatus being shown as applied to the welding of a longitudinally extending seam between the edges of two juxtaposed plates or sheets of metal; Fig. 2 is a transverse section of the same taken on the plane indicated by the line 2—2, Fig. 1; Fig. 3 is a broken sectional view similar to Fig. 2, showing a modification in the construction of one of the component parts of the apparatus; and Fig. 4 is a view similar to Fig. 3, showing still a further modification.

As indicated in the arrangement illustrated in the several figures of the drawings, the work is shown as consisting of two sheets 1, 1, which are disposed with the edges thereof that are to be joined together in substantially abutting relation. Sufficient space, however, is left between such edges or the latter may be slightly beveled so that a filler strip or wire 2 may be inserted therebetween, or such strip may be placed so as simply to rest upon the seam. This element 2 will usually be of the same material, i. e. iron or steel, as the metal of the sheets but may, if desired, contain special alloying constituents or even be of a different metal entirely, so far as the practice of the present invention is concerned. The object of the welding operation, it will be understood, is to melt down such element 2 and interfuse the same with the edges of the sheets 1, 1, so that the resultant seam 3, as shown at the left-hand end of Fig. 1, will be of substantially the same thickness as the sheets and possess a strength and ductility equal to, if not greater than, that possessed by such sheets.

The latter with such filler element 2 interposed between or resting upon their abutting edges are supported upon a bed or anvil 4, which will preferably be of steel, except for a strip 5 of copper which is disposed directly beneath the seam and thus below the line of the weld. The welding, as previously indicated, is accomplished by means of an electric arc, a carbon electrode 6 being employed and the welding circuit including such carbon, the filler element 2 and the bed or anvil 4 or rather the strip 5 which, as aforesaid, forms a part thereof. The holder 7 for such electrode, shown in side elevation in Fig. 1, is of a special design that forms no part of the present invention, such holder being characterized among other things by having connections 8 for circulating a cooling liquid through the body thereof.

For the purpose of clamping the sheets 1, 1, onto the supporting bed or anvil 4, I employ two bars 9, 9, that are laid on the work, one of each side of the seam or joint to be welded. These bars are of such weight in themselves, or such additional pressure may be applied thereto, as to cause them to retain the edges of the sheets that constitute the work securely in place upon such bed and they will be of metal or equivalent conductive material. Preferably the main body of said bars is made of steel, but each bar is provided along its lower edge with a base 10, of copper or equivalent metal of relatively high heat as well as electrical conductivity, such base being integrally united as by welding or otherwise firmly secured to such steel portion of the bar. The dimensions of the latter in cross section may vary. Preferably such bars will be of greater height than width, as shown in Fig. 2, so as laterally to enclose the electrode 6 and the arc that is formed between the latter and the work when the operation of welding is in progress. It will further be noted that the bases 10 of said bars are respectively formed with inwardly extending portions or toes 11 that may be approached closely to either side of the seam or line of weld, and in such position overlie the corresponding edges of the copper strip 5 in bed 4; also that the upper corners of the juxtaposed edges of such bases 10 are cut away or beveled.

The general features of construction thus far described, it should be noted, are set forth and claimed in the co-pending application of J. F. Lincoln, filed July 3, 1923, Serial No. 649,246, and it is accordingly to the following features of improvement that attention is herein more particularly directed.

Referring first of all to the copper strip 5, it should be explained that while the bed 4 is formed with a recess 12 to receive such strip, so that the upper face thereof will lie substantially flush with the upper surface of the bed, the strip is not so tightly fitted to the recess but that it is capable of vertical movement therein. Aligned with the recess 12 and extending downwardly therefrom through bed 4 is a series of apertures 13 in which reciprocably fit the upper ends of a corresponding series of plungers 14. The main bodies of such plungers are housed in a portion of the frame 15 that carries the bed 4, and surrounding each plunger is a compression spring 16 that coacts with a shoulder 17 thereon so as to tend to press the plunger upwardly. The lower end of each plunger has a nut 18 threaded thereon, such end with the nut lying in a transverse opening 19 in the housing support 15 so that the nut is accessible for the purpose of adjustment. It will be obvious that by adjustment of the nut on any plunger, the upward movement of the latter will be correspondingly limited so as to raise the portion of the strip 5, wherewith its upper end engages, the desired slight amount in recess 12.

As a result of the foregoing construction, the copper strip, it will be seen, is in effect resiliently supported throughout its length and accordingly when the sheets 1 are placed on the bed with their abutting edges on such strip and the bases of the bars 9 are thereupon depressed into contact with such sheets, the latter will in turn be brought into uniform pressure-contact with the strip 5. In other words, in case there are any slight bends in the sheets or irregularities in the contour of such edges, the strip 5, which is sufficiently flexible for the purpose, will accommodate itself thereto and be brought into substantially uniform contact with the edges of the plates under pressure of the resiliently actuated plungers.

The bases 10 of the bars 9, as shown in Fig. 2, are cut away on their under faces save adjacent their inwardly directed portions or toes, as such portions have been designated above. Substantially the same effect is secured in the modified construction shown in Fig. 3 where strips 20, of the same general construction as the bases 10, are set into downwardly and inwardly inclining recesses 21 formed in the juxtaposed lower edges of the bars 9. Such inset strips, in other words, give the same effect as the inner beveled edges or toes of the bases 10. In both forms of construction, it will be seen, the strips that constitute the bases of the bars 9 are formed so as to contact with the plates that are to be welded together along their juxtaposed edges only. This further assists in securing a uniform clamping action of the edge portions of the plates between such bases and the resiliently supported strip 5 in the bed 4.

In order to introduce still more adjustability in the work clamping means thus provided, the further modification in construction shown in Fig. 4 may be utilized. The strips 22 are substantially identical with the strips 20 shown in Fig. 3 and are similarly inset in recesses 23 in bars 9. However, instead of being relatively fixedly held in such recesses, such strips 22 are capable of sliding movement in a direction transverse of the bars. A series of set screws 24 being inserted at intervals between the bottoms of the recesses and the corresponding edge of each strip provide an adjustable backing for the strip supplementing that afforded by the spring actuated plungers which support the strip 5 in the bed.

As a result of the cutting away of the under faces of the two strips 10 and the equivalent conformation in cross-section of the strips 20 and 22 in the modified constructions shown in Figs. 3 and 4 respectively, the restricted portions of such faces that contact with the work along the line of the weld will substantially overlap the flexible resiliently supported strip 5 on the bed. It should further be noted that due to the fact that the material of the strips 10 is copper or other metal of equivalent high heat conductivity, the arc once struck preferentially stays by the pool of molten metal or crater thereby formed in the work and as the electrode is moved along the line of the weld and the arc becomes attenuated, it will more readily follow such line where the latter is guarded, so to speak, on either side by a strip of the character described, particularly when associated with bars of the character of the bars 9. The latter, and particularly the strips that form the bases thereof, are not apt to become heated even in the proximity of the arc to the degree that the portion of the filler strip just forward of the arc and the adjacent edge portions of the sheets 1 do. Accordingly, the arc is constrained to move in the desired direction instead of jumping to one side or the other.

The inwardly directed portions of such bases or strips furthermore serve to confine any overflow of molten metal resulting from the interfusion of the filler strip or wire 2 with the abutting edges of the plates 1 and so assist in forming a smooth seam with straight edges throughout its length.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In arc welding mechanism, the combination of a bed for supporting the work and an electrode and holder therefor movable relatively to said bed in a longitudinal direction, said bed comprising a suitable support and a strip of metal having a relatively high conductivity carried by said support in line with the path of travel of said electrode, wherewith the work may directly contact, and a series of spaced, spring-pressed plungers engaging the under side of said strip at corresponding spaced points and tending to press the same towards the work.

2. In arc welding mechanism, the combination of a bed for supporting the work and an electrode and holder therefor movable relatively to said bed in a longitudinal direction, said bed comprising a suitable support formed in its upper face with a recess in line with the path of travel of said electrode and a flexible strip of metal having a relatively high conductivity movably held in such recess, wherewith the work may directly contact, and a series of spaced, spring-pressed plungers engaging the under side of said strip at corresponding spaced points and tending to press the same towards the work.

3. In arc welding mechanism, the combination of a bed for supporting the work and an electrode and holder therefor movable relatively to said bed in a longitudinal direction, said bed comprising a suitable support formed in its upper face with a recess in line with the path of travel of said electrode and a flexible strip of metal having a relatively high conductivity movably held in such recess, wherewith the work may directly contact, a series of spaced, spring-pressed plungers engaging the under side of said strip at corresponding spaced points and tending to press the same towards the work, and adjustable means limiting the action of said plungers.

4. In arc welding mechanism, the combination of a bed for supporting the work and an electrode and holder therefor movable relatively to said bed in a longitudinal direction, said bed comprising a suitable support formed in its upper face with a recess in line with the path of travel of said electrode and a flexible strip of metal having a relatively high conductivity movably held in such recess, wherewith the work may directly contact, a series of spaced, spring-pressed plungers engaging the under side of said strip at corresponding spaced points and tending to press the same towards the work, and nuts threaded on said plungers adapted to limit the action thereof, respectively.

5. A work-clamping device for use in arc-welding, comprising a strip of material having a relatively high heat conductivity designed to contact with the work alongside the line being welded, said strip having its under face retreating save for a relatively narrow work-contacting portion.

6. A work-clamping device for use in arc-welding, comprising a strip of material having a relatively high heat conductivity designed to contact with the work alongside the line being welded, said strip having its under face cut away save for a relatively narrow work-contacting portion, and means for pressing said strip to the work.

7. A work-clamping device for use in arc-welding, comprising a strip of material having a relatively high heat conductivity designed to contact with the work alongside the line being welded, said strip having its under face cut away save for a relatively narrow work-contacting portion, and a bar mounted on said strip for pressing the latter to the work.

8. A work-clamping device for use in arc-welding, comprising a strip of material having a relatively high heat conductivity designed to contact with the work alongside the line being welded, said strip having its under face cut away save for a relatively narrow work-contacting portion, and a bar mounted on said strip for pressing the latter to the work, the conection between said strip and bar being adjustable.

9. In arc-welding mechanism, the combination with a bed for supporting the work and an electrode and holder therefor movable relatively to said bed in a longitudinal direction, said bed including a flexible strip of metal having a relatively high conductivity aligned with the path of travel of said electrode, resilient means tending to press said strip towards the work, and two strips of similar highly conductive metal disposed one on each side of the path of travel of said electrode and adapted to contact with the work on the opposite side thereof from said first-mentioned strip, said two strips each having the under face thereof cut away save for a relatively narrow portion lying in substantially overlapping relation with respect to said first-mentioned strip.

10. In arc-welding mechanism, the combination with a bed for supporting the work and an electrode and holder therefor movable relatively to said bed in a longitudinal direction, said bed including a flexible strip of metal having a relatively high conductivity aligned with the path of travel of said electrode, resilient means tending to press said strip toward the work, clamping bars laterally of said electrode, two strips of highly conductive metal disposed one on each side of the path of travel of said electrode and mounted in the clamping bars and adapted to contact with the work, and regulable means carried by the clamping bars for pressing said two strips to the work.

11. In arc-welding mechanism, the combination with a bed for supporting the work and an electrode and holder therefor movable relatively to said bed in a longitudinal direction, said bed including a flexible strip of metal having a relatively high conductivity aligned with the path of travel of said electrode, resilient means tending to press said strip toward the work, clamping bars laterally of said electrode, two strips of highly conductive metal disposed one on each side of the path of travel of said electrode and inset in the clamping bars and adapted to contact with the work, and regulable screw-threaded means for adjusting said strips in the clamping bars.

12. In arc-welding mechanism, the combination of a work supporting bed, a strip of resilient material inset in said bed and arranged in line with the path of travel of the welding electrode, resilient means normally supporting said strip above the surface of said bed, and means for clamping the work on said bed.

Signed by me, this 24" day of September, 1927.

CECIL C. PECK.